(12) United States Patent
Lee

(10) Patent No.: US 7,508,763 B2
(45) Date of Patent: Mar. 24, 2009

(54) METHOD TO REGULATE TRAFFIC CONGESTION IN A NETWORK

(75) Inventor: Man-Ho Lawrence Lee, Milpitas, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 977 days.

(21) Appl. No.: 10/654,727

(22) Filed: Sep. 4, 2003

(65) Prior Publication Data

US 2005/0052994 A1 Mar. 10, 2005

(51) Int. Cl.
*H04L 12/00* (2006.01)
(52) U.S. Cl. .................. 370/235; 370/231; 709/235
(58) Field of Classification Search ......... 370/229–234, 370/235–238.1; 709/232–237
See application file for complete search history.

(56) References Cited

U.S. PATENT DOCUMENTS

| | | | | |
|---|---|---|---|---|
| 5,457,687 A * | 10/1995 | Newman | | 370/232 |
| 5,568,476 A * | 10/1996 | Sherer et al. | | 370/236 |
| 6,029,202 A * | 2/2000 | Frazier et al. | | 709/232 |
| 6,094,418 A * | 7/2000 | Soumiya et al. | | 370/231 |
| 6,144,636 A * | 11/2000 | Aimoto et al. | | 370/229 |
| 6,587,437 B1 * | 7/2003 | Lee et al. | | 370/236.1 |
| 6,628,613 B1 * | 9/2003 | Joung et al. | | 370/230 |
| 6,654,342 B1 * | 11/2003 | Dittia et al. | | 370/229 |
| 6,657,954 B1 * | 12/2003 | Bird et al. | | 370/229 |
| 6,728,211 B1 * | 4/2004 | Peris et al. | | 370/235 |
| 6,826,620 B1 * | 11/2004 | Mawhinney et al. | | 709/235 |
| 7,020,714 B2 * | 3/2006 | Kalyanaraman et al. | | 709/235 |
| 7,180,857 B2 * | 2/2007 | Kawakami et al. | | 370/231 |
| 2002/0118641 A1 * | 8/2002 | Kobayashi | | 370/230 |
| 2003/0103452 A1 * | 6/2003 | Le et al. | | 370/229 |
| 2003/0149785 A1 * | 8/2003 | Gerla et al. | | 709/232 |
| 2003/0163593 A1 * | 8/2003 | Knightly | | 709/251 |
| 2004/0037223 A1 * | 2/2004 | Harrison et al. | | 370/235 |
| 2004/0062201 A1 * | 4/2004 | Deshpande | | 370/235 |
| 2004/0071145 A1 * | 4/2004 | Ha et al. | | 370/395.43 |
| 2004/0095882 A1 * | 5/2004 | Hamzah et al. | | 370/229 |
| 2004/0109443 A1 * | 6/2004 | Gai et al. | | 370/389 |
| 2004/0264366 A1 * | 12/2004 | Swami | | 370/229 |
| 2005/0013245 A1 * | 1/2005 | Sreemanthula et al. | | 370/229 |
| 2006/0026004 A1 * | 2/2006 | Van Nieuwenhuizen | | 705/1 |

* cited by examiner

*Primary Examiner*—Aung S Moe
*Assistant Examiner*—Habte Mered

(57) ABSTRACT

A method and system for controlling traffic on a network. A congestion indicator is generated by network components in response to the flow of network traffic. The congestion indicator is received by a network peripheral node that has a threshold variable which controls the flow of traffic flowing from the network peripheral node. The threshold variable corresponding to the congestion indicator will be reduced in order to restrict the flow of traffic flowing from that network peripheral node. If more than one congestion indicator is received by the network peripheral node, then the threshold variable will continue to be reduced thereby further restricting network traffic. If no further congestion indicators are received, then the network peripheral node will terminate the Back-Off Period state of the threshold variable such that the threshold variable can then be increased and network traffic can increase.

25 Claims, 10 Drawing Sheets

METHOD TO REGULATE TRAFFIC CONGESTION IN A NETWORK

BACKGROUND

In a computer network, numerous nodes communicate with each other in accordance with a communication protocol that provides logical connections between any pair of participating nodes. The nodes may be connected through a fiber, through a wireless network or through some other medium.

A network may have a fixed capacity regardless of the size of the network and the power of the composite components. Only when consumer nodes of the network are underpowered, is it possible to ignore the possibility of network resource contention. Network components that provide network resources usually grow at the same pace and with the same technological advancements as network nodes. Accordingly, networks are usually designed to have flexible functional extensibility for future growth. Usage assumptions that hold at the first deployment of a design may not hold in the future even though a newer design is functionally compatible with older designs.

In the case where network components are not overpowered to guarantee sufficient network resources for extreme or skewed usage, proper measures need to be taken at network nodes to avoid putting too much traffic onto the network. Networking components and protocols are typically designed to handle a predetermined load, but when the load is beyond a certain capacity, the efficiency of the network decreases. Congestion decreases efficiency which results in more loads on the network, causing congestion to increase in a self-aggravating manner.

For example, a network may be implemented with the policy that no packet would be dropped by any network component. Typically, in such type of network architecture, a link-based flow control mechanism called backpressure is implemented to handle resource contention. In the case of resource contention, backpressure control information generated by a resource tight composite component (which may be a node or a network router) would be sent along the communication path towards the direction of the source of the traffic flow to stop an immediate upstream router from sending more traffic to such component. When the resource contention situation has eased at the receiving component, the source of the traffic flow may commence transmitting again. The communication is typically reinitiated by having such component to inform the immediate upstream router to resume transfer to it. During the period of time when the source of traffic flow is not sending, there is zero utilization of the link. Furthermore, this condition can be back-propagated up-path if the backpressure problem still persists. If this type of network is implemented with logical connections sharing links (virtual/physical), such link congestion could lead to pausing of unrelated logical connections which leads to performance degradation.

Another example is where a network may be implemented with the policy that any network component may drop packets if it doesn't have sufficient resources to handle the traffic. Dropping packets would require a recovery on the sender side and would require retransmissions that would further increase the load on the congested network.

In order to most efficiently transfer packets with the least complexity, some networks have been designed with overpowered network components and underpowered nodes. This approach can avoid the need for any congestion control or traffic control mechanism. However, when the network architecture is extended in size or more powerful network components are introduced, this assumption does not hold. In such a situation, the introduction of enhanced network components may create new hotspots, aggravate existing hotspots or change the hotspot of the network. It also increases performance variation among network components.

Another network architecture provides only best effort services wherein the traffic flowing within the network is not monitored or managed. Instead, an end node allows clients' data traffic to go onto the network as long as it has enough resources to process such transfer on the sending side of a logical connection. This network architecture assumes that the servicing network is able to handle the traffic unless there is a physical connectivity problem existing somewhere on the communication path corresponding to such transfer. There are no measures taken to detect or prevent network congestion, or alleviate congestion problems.

It is also possible to design a static single node centric non-distributed network in order to alleviate network congestion problems. Specifically, the designer of this type of network devises a policy for each participating node limiting the amount of load a node puts onto the network. The policy is based on the assumption that other nodes are utilizing the network in a similar manner. Typically, the policy must bias towards the most pessimistic assumption in order to avoid problematic scenarios. The amount of biasing is usually based on an educated guess as to what the most severe type of network congestion will be. However, the fact that these extreme cases usually dictate the boundary conditions, but are rare in occurrence, can cause the architecture to be over-constrained and under-performing in most cases. Moreover, assumptions made on such a simplistic model are usually wrong in one way or another because the load experienced by the network usually depends on more than just the behavior of a single node. In many cases, the viability of such policy relies on the assumption that network traffic is evenly distributed. However, such assumption usually precludes the most problematic scenarios a congestion control algorithm should solve.

A distributed traffic control solution for a network can also be used to control network traffic. In such a network, participating nodes exchange traffic information using either in-band or out-of-band communication mechanisms. By exchanging such traffic information, each participating node would have an idea of the current network usage, and would be able to subsequently determine how such overall condition affects the usage policy.

A distributed peer-to-peer network model allows peers to simply exchange network usage information and let the nodes decide individually what to do with the network usage information. Typically, the participating node would use well defined policies when deciding how much load to put onto a network based on the collected network usage information. For example, each node collects network usage information from other nodes regarding the current outstanding traffic. A node can continue to put a load on the network if the total amount of outstanding traffic from all participating nodes is less than a certain predetermined threshold.

In a distributed master-slave network model, the master node collects network usage information from the slave nodes and uses such information to decide the amount of network resources a particular slave node may utilize.

The policies that the nodes utilize are typically based on a certain computational model as a function of the network configurations such as the topology of the network, the type of participating components, etc. For example, the nodal logic has to be aware of how different logical connections utilize the networking components. The logic may have to be aware of a bottleneck connection between a group of tightly coupled processors and an external fabric, and how restraining such bottleneck connection affects all outgoing traffic. An accurate model mirrors how the hardware is connected together. However, for a sophisticated network, the computation and the resulting combinatorics may be too complicated to accurately model.

A good computational model must provide a close approximation of the real platform. The model cannot be over-simplistic or its behavior would not mirror the real platform. As such, a simplistic model usually is biased toward a more restrictive model to ensure the model can run safely without over-accurately mirroring the real platform behavior. However, in a complex network environment with hundreds of nodes connected together in a non-trivial way, such simplistic yet accurate models are very hard to obtain.

What is needed is a system and method that does not require a model to be built before deploying algorithms. A model devised for handling network resource usage might be too simple and problematic on boundary and extreme cases. Much time has to be spent on designing an accurate model with little operational overhead. Also needed is a cooperative distributed algorithm that is extensible.

SUMMARY

Briefly, an embodiment of the present invention provides an adaptive feedback system for regulating traffic in a network having a plurality of components, the traffic being created as the components exchange data and consume network resources. The system includes: means for generating at least one congestion indicator at a network component responsive to an indication of traffic congestion in the network; and at least one network peripheral node responsive to the congestion indicator. A threshold variable associated with the received congestion indicator is used to define a maximum amount of a specified type of network resources to be allocated for a use associated with the receiving network peripheral.

The congestion indicators may be implemented using control packets. In different embodiments of the present invention, the congestion indicators may be generated based on any of a wide variety of indicators including a transfer timeout, excessive control information, a buffer reaching a watermark, a timeout, link utilization or packet dropping statistics. As mentioned, each threshold variable may be associated with a specified type of network resources. As an example, the threshold variable may be associated with outstanding outgoing traffic from the network component. Other examples are described below.

The system also includes means for controlling the flow of traffic across the network based at least in part on the value of the threshold variable, which is managed based on the reception of the congestion indicators. In one embodiment, the means for controlling the flow of traffic includes a transport control mechanism. For example, a threshold might be used to limit the credits given to remote nodes, of which there might be up to hundreds or thousands, for data pulling. A remote node initiates a data pulling operation with a volume or rate of traffic corresponding to the issued credits. If there is no limit to the amount of concurrent data pulling operations, the node on which the data resides might be overwhelmed by the unbounded number of data pulling requests. As the incoming data pulling request is small in size and the actual data pulling out is typically much larger, the send engine would be busy keeping up with the rate of incoming remote data pulling requests. Such condition, if not regulated, could result in network congestion. A threshold can be used to limit the amount of credits given to remote nodes, which in turns limits the amount of incoming remote data pull requests. In this way, the rate of outgoing remote data pull traffic is limited. By adjusting the threshold controlling the total amount of credits given out to remote nodes, it may be possible to approach an optimal operational state in which network congestion can be avoided.

In one embodiment, a peripheral node may include: a Feedback Mechanism configured to initiate a Back-Off Period at the receiving component in response to receiving the congestion indicator, reduce the current threshold value in response to the reception of valid congestion indicator, further reduce the current threshold value in response to subsequent receptions of valid congestion indicators, restore the current threshold value in response to a period of absence of congestion indicators, and terminate a Back-Off Period when the current threshold value has restored back up to a certain value; and a Slow Advance Mechanism configured to adjust the value of the threshold variable to increase the maximum amount of the specified type of network resources to be allocated on-demand when the Feedback Mechanism is not active. During the Back-Off Period, the Feedback Mechanism may perform a back off process by: initiating a back off time interval; determining if an additional valid congestion indicator associated with the threshold variable has been received within the back off time interval; and if an additional valid congestion indicator associated with the threshold variable has been received within the back off time interval, adjusting the value of the threshold variable to reduce the maximum amount of the specified type of network resources to be allocated for the use associated with the receiving network node. If an additional valid congestion indicator associated with the threshold variable has not been received within the back off time interval, the Feedback Mechanism adjusts the value of the threshold variable to increase the maximum amount of the specified type of network resources to be allocated. The Feedback Mechanism terminates the Back-Off Period if the value of the threshold has reached a certain limit.

In one embodiment, the Feedback Mechanism may be further configured to: compare a current value of the threshold variable to an initial value of the threshold variable; and if the current value is greater than the initial of the threshold variable, terminate the Back-Off Period. The Feedback Mechanism may also be configured to: record an initial value of the threshold variable as a value of a Last Known Good Threshold Variable upon the initiation of a Back-Off Period.

In another embodiment, the Feedback Mechanism may be further configured to: compare the current value of the threshold variable to the current value of the Last Known Good Threshold Variable; and terminate the Back-Off Period if the current value of the threshold variable is greater than or equal to the current value of the Last Known Good Threshold Variable. The value of the Last Known Good Threshold Variable may be decayed during the back off time period. Such decay process is independent of the Feedback Mechanism's event driven operation. In one embodiment, the value of the Last Known Good Threshold Variable is decayed by a small unit amount every fixed period of time duration. Such fixed time duration may be configurable. In another embodiment, the value of the Last Known Good Threshold Variable is decayed in a self-clocking manner in such a way that the frequency of decay is directly proportional to the amount of traffic processed by the transport mechanism in which the Feedback Mechanism is implemented.

In one embodiment, the Slow Advance Mechanism is configured to: initiate a Slow Advance Time Interval upon the termination of a Back-Off Period or after the Slow Advance Mechanism has increased the value of the threshold variable; in the event of an increase demand of the specified type of resources, compare the currently used amount to the maximum amount of the specified type of resources allocated as indicated by a current value of the threshold variable. If there is a demand to increase the maximum amount of resources allocated, and the Slow Advance Timer has expired, the Slow Advance Mechanism adjusts the value of the threshold variable to increase, by a configurable unit amount, the maximum amount maximum amount of the specified type of network resources to be allocated. As mentioned earlier in this paragraph, the Slow Advance Time Interval is then reinitiated again. In case the Slow Advance Timer has not yet expired, and there is a demand to increase the maximum amount of resources allocated, the current threshold would not be increased. The request causing such an increase demand would have to be deferred by the transport protocol.

The described system and method does not assume knowledge about the usage pattern of the network resource consumer that implements the above described methodology, nor the usage pattern of the other network resource consumers. It also does not assume the architecture of the underlying protocol and the physical topology of network. Participating entities work on an individual basis without requiring a sophisticated distributed protocol. This methodology is designed to react to all particular cases that happen to a network.

BRIEF DESCRIPTION OF THE DRAWING

The accompanying drawing, which is incorporated in and constitutes a part of this specification, illustrates several embodiments of the disclosed method and apparatus, and together with the description, serves to explain the principles of the disclosed method and apparatus. Wherever convenient, the same reference numbers will be used throughout the drawing to refer to the same or like elements.

DETAILED DESCRIPTION

Figure 1:
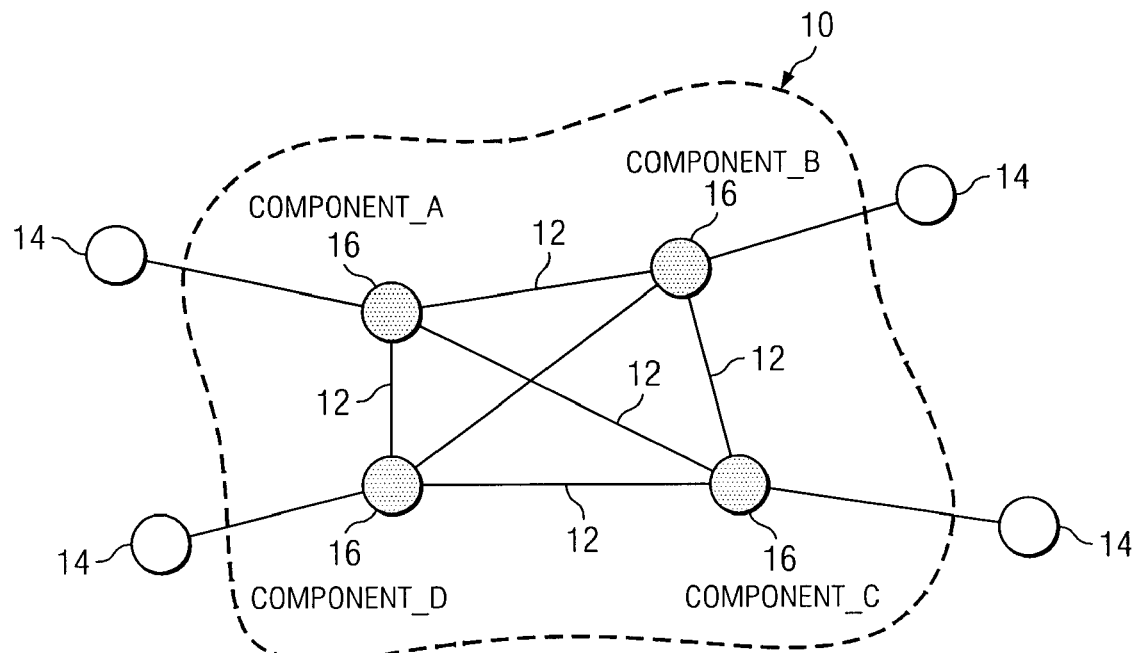
FIG. 1 is a block diagram illustrating a network in which traffic is regulated.

To enable one of ordinary skill in the art to make and use the disclosed embodiments, a description is presented herein in the context of a patent application and its requirements. Although the present application describes certain embodiments, one of ordinary skill in the art will readily recognize that there could be variations to the embodiments.

The meaning imparted to the terms below and throughout this paper is intended not as a limitation but merely to convey character or property relevant to the method and apparatus described herein. Where the terms have a special meaning or a meaning that is inapposite to accepted meaning in the art, the value of such meaning is not intended to be sacrificed to well-worn phrases or terms.

Node: A network resource consumer (can be a producer at the same time) that attaches to a network. Typically, such component participates in a communication protocol and exchanges data traffic with other nodes. Being a consumer, it generates traffic to consume network resources such as network bandwidth, network buffering, processing cycles on network switches, etc.

Logical Connection: Provided by a communication protocol to allow the participant nodes on either end of such a connection to be encapsulated from the details of how the nodes are physically connected. The nodes can view each other as if they are directly connected to each other through the communication protocol provided. A logical connection can be built directly on top of a single physical link or numerous links that are part of a local area network, wide area network or system area network. A logical connection may be connection oriented or connectionless oriented. In this context, logical connectivity is relevant to whether two nodes can communicate with each other using only the knowledge of the specified protocol as opposed to requiring a connection before communicating with each other as in a connection oriented protocol.

Congestion Control: Refers to optimizing the performance on a network by reducing the amount of overhead induced by having too much traffic on the network. For example, if packets can be dropped when there is not enough buffering at a network component, a congestion control mechanism reduces the chance of retransmission caused by dropping packets. Alternatively, if a stream of transmission is put on hold when there is not enough buffering at a network component, a congestion control mechanism reduces the chance of having such data stream and other unrelated data streams being put on hold. A congestion control mechanism can also be referred to as a congestion avoidance mechanism.

Traffic Control: Provides mechanisms and methods for controlling how network resources should be utilized. Typically, traffic control covers a broader area than congestion control. For example, traffic control may allow an operator to specify how certain network resources are allocated and allow the operator to limit the rate of data traffic flowing from a node.

Congestion Indicators: Events and statistics monitored for detecting network congestion. As will be further described below, a network resource consumer, typically an end node, reacts to congestion indicators by scaling back the appropriate traffic by a certain amount.

Congestion Indicators at the node's point of presence: A congestion indicator that is generated at the node by observing the events and statistics at the peripheral of the network without relying on inner network components to supply additional information on the condition of the network.

Congestion Indicators generated by inner network components: A congestion indicator generated at a network component inside the network not at the node. Such congestion indicators require additional logic in the network component to detect congestion and generate the corresponding congestion indicators.

Threshold Variable: A working and changing variable used to control resource usage. As will be further explained below, a threshold variable can be used to control the amount of outstanding traffic for a node.

Referring to FIG. 1, a network 10 has a plurality of connections 12 interconnecting a plurality of nodes 14. Each of the nodes 14 is connected to a respective one of a plurality of components 16 designated COMPONENT_A through COMPONENT_D. These components are typically called routers or switches. The nodes 14 generate traffic to be transferred over the connections 12, and consume resources of the network 10 such as bandwidth of connections 12, buffering and processing resources in COMPONENT_A through COMPONENT_D. As previously mentioned, it is advantageous to control the traffic flowing through the connections 12 in order to operate the network 10 efficiently. It is assumed that the network 10 is functioning without any physical connectivity problems and without flow control errors.

The network 10 may be of any type, regardless of whether the network is a heterogeneous network, a homogenous network with components of similar processing (consuming) power or with components with a vast difference in processing power. The described method and apparatus does not assume the knowledge of individual component or the composition of the collection of components. Participating entities operate on an individual basis without a need for a cooperative distributed algorithm.

Figure 2:
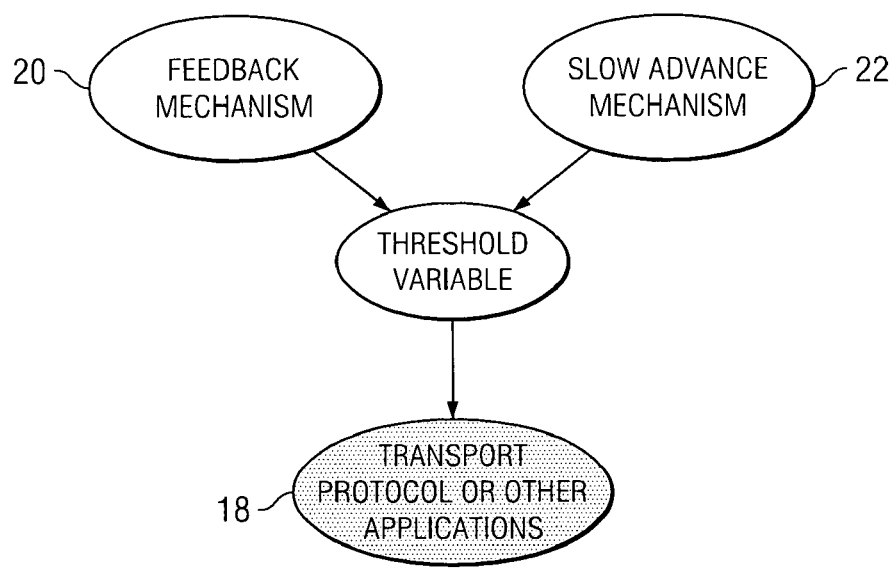
FIG. 2 is a generalized block diagram illustrating components for controlling traffic on the network shown in FIG. 1.

FIG. 2 is a block diagram illustrating mechanisms for regulating traffic in the network 10 (FIG. 1). A transport protocol 18 controls the flow of traffic in the network. In order to efficiently control the flow of traffic over the network 10 generated by nodes 14 using transport protocol 18, a Feedback Mechanism 20 may provide for regulating the amount of traffic in network 10 (FIG. 1) by monitoring congestion indicators generated by components 16 in order to prevent the network 10 to get into a congested situation. Furthermore, a Slow Advance Mechanism 22 may slowly increase the flow of traffic in accordance with the transport protocol 18, as will be further explained below. The Slow Advance Mechanism 22, Feedback Mechanism 20 and transport protocol 18 are programs resident on the nodes 14 of the network shown in FIG. 1. As will be further explained below, by monitoring and regulating the amount of traffic flowing through the network 10 (FIG. 1) with the Feedback Mechanism 20 and by controlling the amount of traffic transmitted in accordance with the transport protocol 18, it is possible to efficiently control the traffic across the network 10 in order to avoid congestion.

Figure 3A:
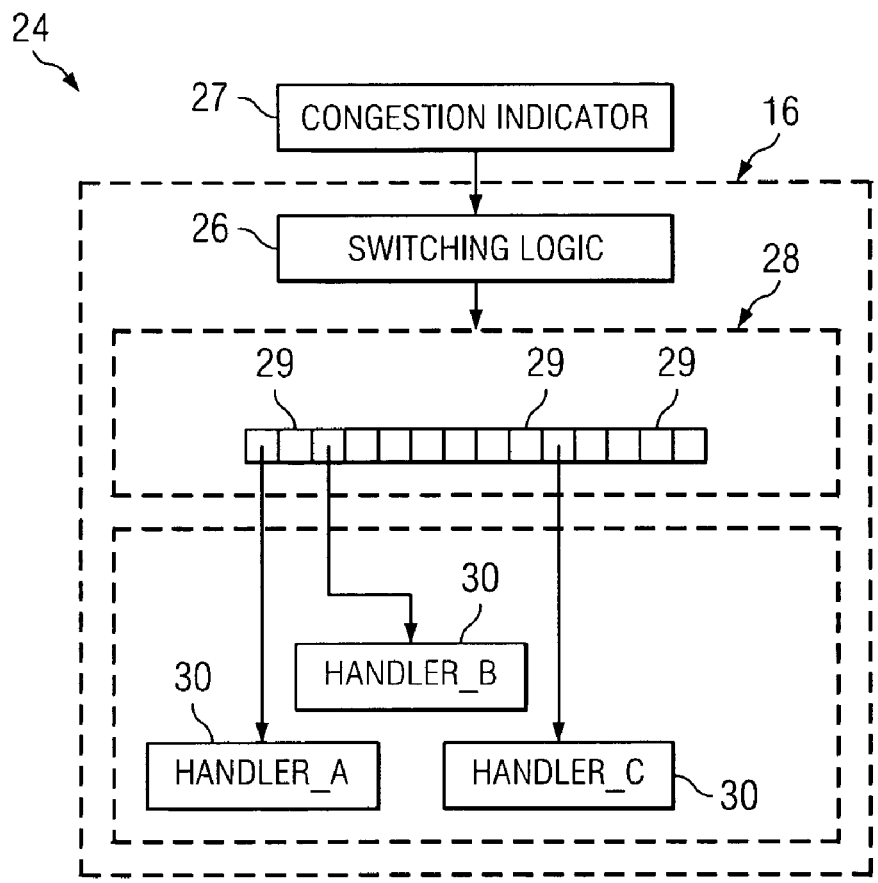
FIG. 3A illustrates nodal logic for processing a congestion indicator.

FIG. 3A shows a block diagram illustrating further details of one of the network resource consuming node 14 (FIG. 1) at 24. Each of the nodes 14 includes: switching logic 26 for receiving congestion indicators 27 of different types; and a data structure 28 having an array of pointers 29 used for selecting from a plurality of handlers 30 supporting different types of congestion indicators. As explained below, the switching logic 26 reads each congestion indicator 27 to determine its type, and indexes the data structure 28 to select an appropriate one of the handlers 30 based on the type of congestion indicator received. The selected one of the handlers 30 is then invoked to process the received congestion indicator. As explained below, each received congestion indicator is associated with a threshold variable that is used to define a maximum amount of a specified type of network resources allocated for use by a node 14 (FIG. 1).

Each congestion indicator 27 is indicative of a particular aspect of the flow of traffic through the network 10 (FIG. 1). As explained below, a congestion indicator may be generated in the network based on any of a wide variety of different measures of traffic congestion. Congestion indicators may be implemented in the form of control packets indicating the congestion indicator type and the identity of the originating network component in the network. In a network environment, there is usually an infrastructure for participating nodes and components to exchange information and to support more than one type of control information. It is possible to distinguish different types of control information by control packet type and define a control type specifically for congestion indicators. In this way, when a node receives a control packet type for a congestion indicator, it is possible for the node to decide whether to process the congestion indicator or not. For example, a node may be configured to ignore unrecognized congestion indicators.

A congestion indicator 27 (FIG. 3A) is typically associated with one congestion indicator handler 30. In such case, the reception of a congestion indicator triggers a call to the associated congestion indicator handler as described above. In another embodiment, a congestion indicator may be associated with more than one congestion indicator handler. The reception of this type of congestion indicator would trigger a call to more than one associated congestion indicator handler 30 (FIG. 3A). Depending on the actual implementation, this may not be done unconditionally. More than one congestion indicator 27 may be associated with one congestion indicator handler 30 (FIG. 3A). In this last case, the reception of any of the associated congestion indicators would trigger a call to the congestion indicator handler. An implementation may choose a hybrid of these variations. Each of the handlers 30 may contain different function calls to process the reception of a congestion indicator for one or more threshold variables. For example, a congestion indicator handler may contain three function calls wherein each function call invokes the Feedback Mechanism 20 (FIG. 2) for three different threshold variables.

Figure 3B:
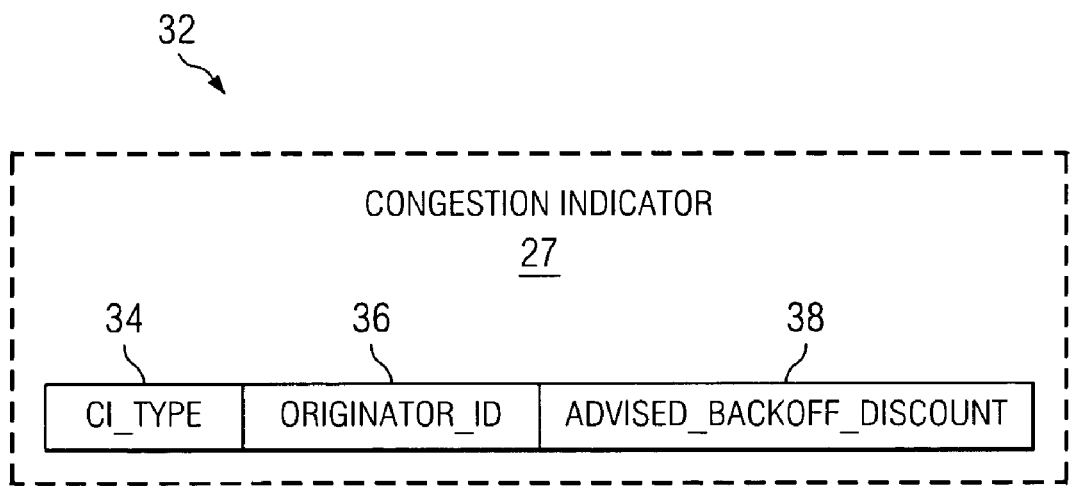
FIG. 3B illustrates a typical control packet format of the congestion indicator.

FIG. 3B shows a block diagram generally illustrating an exemplary data field structure at 32 of a congestion indicator 27 (FIG. 3A). In the depicted embodiment, the congestion indicator 27 includes: a first field 34 carrying a congestion indicator type value designated CI_TYPE; a second field 36 carrying an originator identity value designated ORIGINATOR_ID; and a third field 38 carrying an advised traffic reduction value designated ADVISORY_BACK OFF_DISCOUNT, which is expressed as a percentage of traffic. The originator identity value in field 36 informs a receiving component about the identity and location of the entity that generated the congestion indicator. With the CI_TYPE and ORIGINATOR_ID values, a receiver node may determine the location in the network that is affected by congestion. In one embodiment, the ADVISORY_BACK OFF_DISCOUNT does not specify an absolute level of traffic reduction. Instead, the level of traffic reduction is expressed relative to the current resource consumption level. In one embodiment, the node receiving a congestion indicator 27 may use the advised traffic reduction value or override it.

Each congestion indicator is associated with a threshold variable adjusted by the Feedback Mechanism 20 (FIG. 2). As will be further explained below, the threshold variable can be adjusted by the Feedback Mechanism in order to regulate the flow of traffic in accordance with the transport protocol 18. The Feedback Mechanism 20 should adjust the threshold variable associated with the received congestion indicator in such a way to avoid getting more congestion indicators.

As mentioned, the congestion indicator type value CI_TYPE 34 (FIG. 3B) indicates a type of the congestion indicator. For example, one congestion indicator type value may indicate that the congestion indicator is generated because the reception buffer of an inner network component has reached the 90% watermark. The originator identity value ORIGINATOR_ID 36 (FIG. 3B) tells the receiver about the identity of the entity that generated the congestion indicator. These two pieces of information may be used to indicate the receiving component the threshold variable of which would be affected by this congestion indicator.

The value of a threshold variable is adjusted downward by the Feedback Mechanism 20 (FIG. 2) upon the reception of congestion indicators 27, adjusted upward by the Feedback Mechanism 20 in the extended absence of congestion indicators, and adjusted upward on demand by the Slow Advance Mechanism 22 when the threshold variable is not in a state of Back-Off Period. A threshold variable is said to be in a Back Off Period or in a backed-off state when its value is under the control of the Feedback Mechanism 20. In case when the value of a threshold variable is under the control of the Slow Advance Mechanism, it is said to be not in a backed off state. As will be further explained below, the Feedback Mechanism will slowly reduce the value of the threshold variable on direct evidence of network congestion, i.e., the reception of congestion indicators, thereby decreasing network traffic. Conversely, the Slow Advance Mechanism 22 (FIG. 2) will slowly increase the value of the threshold variable upon demand to increase network traffic. With the Feedback Mechanism 20 and the Slow Advance Mechanism 22, it is possible to control resource usage in order to control network traffic.

The threshold variable affects the load that an end node puts onto a network. By adjusting the threshold variable, a node can control how much load it puts onto a network. A threshold variable may be a variable for controlling the amount of outstanding traffic from a node to other nodes in terms of bytes. In another embodiment, a threshold variable may control the amount of outstanding traffic credit a node has given to other nodes in terms of bytes. In this embodiment, enough matching traffic credit on the other node is required for the node to send traffic. Alternately, in another embodiment, the threshold variable may control the amount of outstanding outgoing traffic from a node to all other nodes in terms of the number of messages or packets. A threshold variable may control the amount of outstanding, outgoing traffic from a node to all other non-local nodes in terms of bytes. In another embodiment, a timer indicating how long to wait for an acknowledgement before timing out a transfer may provide the basis for a threshold variable. Each threshold variable should operate independently of other threshold variables.

In the simplest case, a threshold variable may be a parameter corresponding to some network resources used by only one single logical connection. In such case, there is no need to account for fair share issues. The congestion indicator that is received for this logical connection would be applicable only to this logical connection and would not be causing any side effect to the other logical connections. In other embodiments, a threshold variable may be a parameter that corresponds to some network resources shared by multiple logical connections. In this embodiment, there is a risk that the congestion indicators received from a single logical connection would be limiting how other logical connections use the shared resources if such the receiving node is receiving an overwhelming number of those. Additional policy has to be enforced to make sure that the Feedback Mechanism 20 (FIG. 2) is not over penalizing and preventing other sharing logical connections from using the shared resources. Such preventive measure can be as simple as allowing the Feedback Mechanism 20 (FIG. 2) to deduct at most a value (a threshold variable value/number sharing logical connections) in total from the said threshold variable for each logical connection until such threshold variable has exited the current backed off state, i.e., when the Back-Off Period associated with such threshold variable is terminated. As explained below, the threshold variable value used in the above calculation may be the Last Known Good Threshold Variable value. The Last Known Good Threshold Variable value is the threshold variable's value right before the algorithm declares a Back-Off Period for such threshold variable.

As mentioned, each threshold variable is associated with at least one type of congestion indicator. The congestion indicator provides an input to the Feedback Mechanism 20 (FIG. 2) to indicate that a reporting network is probably overloaded. The Feedback Mechanism should adjust the corresponding threshold variable as a way to avoid receiving more congestion indicators. A threshold variable that is not associated with any congestion indicator is a trivial case as will be readily understood by those of ordinary skill in the art. In this trivial case, both the Feedback Mechanism 20 and the Slow Advance Mechanism 22 (FIG. 2) should be turned off, or the threshold variable will keep on increasing. This is a degenerated case in which all nodes would limit the resource usage using a static threshold.

As mentioned above, congestion indicators 27 (FIG. 3A) may be generated in the network based on a wide variety of different indicators of traffic congestion. In one embodiment, a congestion indicator is generated based on a transfer timeout which may be triggered by excessive load on a network. For example, in a network where an acknowledgement is associated with each successful transfer, a timeout mechanism is used to tell whether the sender should retransmit a particular packet/message. An excessive amount of transfer timeouts could be used as the basis for a congestion indicator indicating network congestion. However, the transfer timeout may also indicate that there are physical hardware problems with the network.

In another embodiment, a near timeout may be used to generate a congestion indicator. Some network architectures provide a mechanism for the transport mechanism to report transmissions that have almost timed-out but actually have not. For example, if a transmission is set to time out in 10 ms, a lower level driver may report a transfer timeout if it does not receive an expected acknowledgment associated with the transmission within 10 ms. Such lower level driver may also monitor the time when acknowledgements are received. In this embodiment, the driver reports to clients a near timeout for a particular transfer if it takes longer than a prescribed time, but less than the time to record a timeout (e.g., between 9 ms and 10 ms). A near timeout may indicate that transmissions are taking longer to complete and that the network is becoming congested. A near timeout mechanism is more desirable than a transfer timeout mechanism as a congestion indicator because the near timeout mechanism is not overloaded to report physical connectivity problems.

In yet another embodiment, a congestion indicator may be implemented based on a transparent timeout. A lower level driver may transparently retransmit a packet for a higher level client if the driver fails to receive an acknowledgement for the packet. This is provided to avoid the invocation of a more complicated recovery process at the higher level client if a simple retransmission at the low level would do the job. This is typically the case if the first timeout was caused by a spike up of traffic. In such a case, if a packet has to be retransmitted transparently and the retransmission succeeds, the link has no physical connectivity problems. Therefore, the only potential cause of such a transparent retransmission would be network congestion. A lower level driver may be configured to report such transparent timeouts as a congestion indicator.

In another embodiment, excessive control information may be used to generate a congestion indicator. For example, excessive backpressure control information may be shown in a link in a congested network where packets are not dropped but the involved paths are backpressured when congestion occurs. If congestion is severe, backpressure may back propagate to other connected paths upstream. Such backpressure is realized by having a network component to detect such congested link condition and then assert backpressure control information (e.g., a no go symbol) back to the corresponding source of the congested path/link. The condition of such link or path is relieved when such network components indicate that the condition is relieved by sending control information back to the source of the congested path/link. Excessive invocations of such a flow control mechanism indicate that the generator of the initial backpressure is being congested.

In a further embodiment, a determination that a buffer has reached its high watermark may be used to generate a congestion indicator. In this embodiment, an inner network component may monitor its buffering resources usage. When a certain high watermark threshold is reached, the network component would be at a risk of a buffer overflow. In such a case, the network component may generate and send a congestion indicator to involved network nodes for appropriate action.

In other embodiments, link utilization may be monitored by a network resource consuming node at a network peripheral or by the inner network components to generate a congestion indicator. High link utilization is indicative of a heavy network load. When a certain high watermark threshold is reached indicating link utilization, a congestion indicator may be generated.

In yet another embodiment, packet dropping statistics may be used to generate an indication of network congestion. The dropping of a packet is an indication that the network component may not be able to handle the amount of traffic. A network component may generate a congestion indicator when packets start to drop.

It will be noted that some congestion indicators overlap in coverage. For example, a near timeout and an actual timeout would not both be used as congestion indicators at the same time because this would incur a risk of double counting timeouts. It will be understood by those of ordinary skill in the art that congestion indicators may be chosen such that complementary congestion situations are monitored.

Instead of indirectly defining the congestion condition at a node in terms of its units of manipulations (e.g., the unit of manipulation is unit amount of transfer outstanding if an algorithm defines congestion as the condition when the total amount of traffic outstanding has exceeded a certain threshold), congestion of a network may be defined by implemented congestion indicators in such a network configuration, which is directly affected by how a certain network resource is used. After defining congestion conditions, one only needs to define what the involved parties are to send those congestion indictors to. Such direct translation of network congestion conditions to a first hand detector reduces the approximating problems induced by having an unnecessary mapping situated in between the reality and the implementation. A mapping can be in the form of a complex distributed traffic regulation model or a simple processor centric non-distributed algorithmic instance executing on a network node.

Figure 4A:
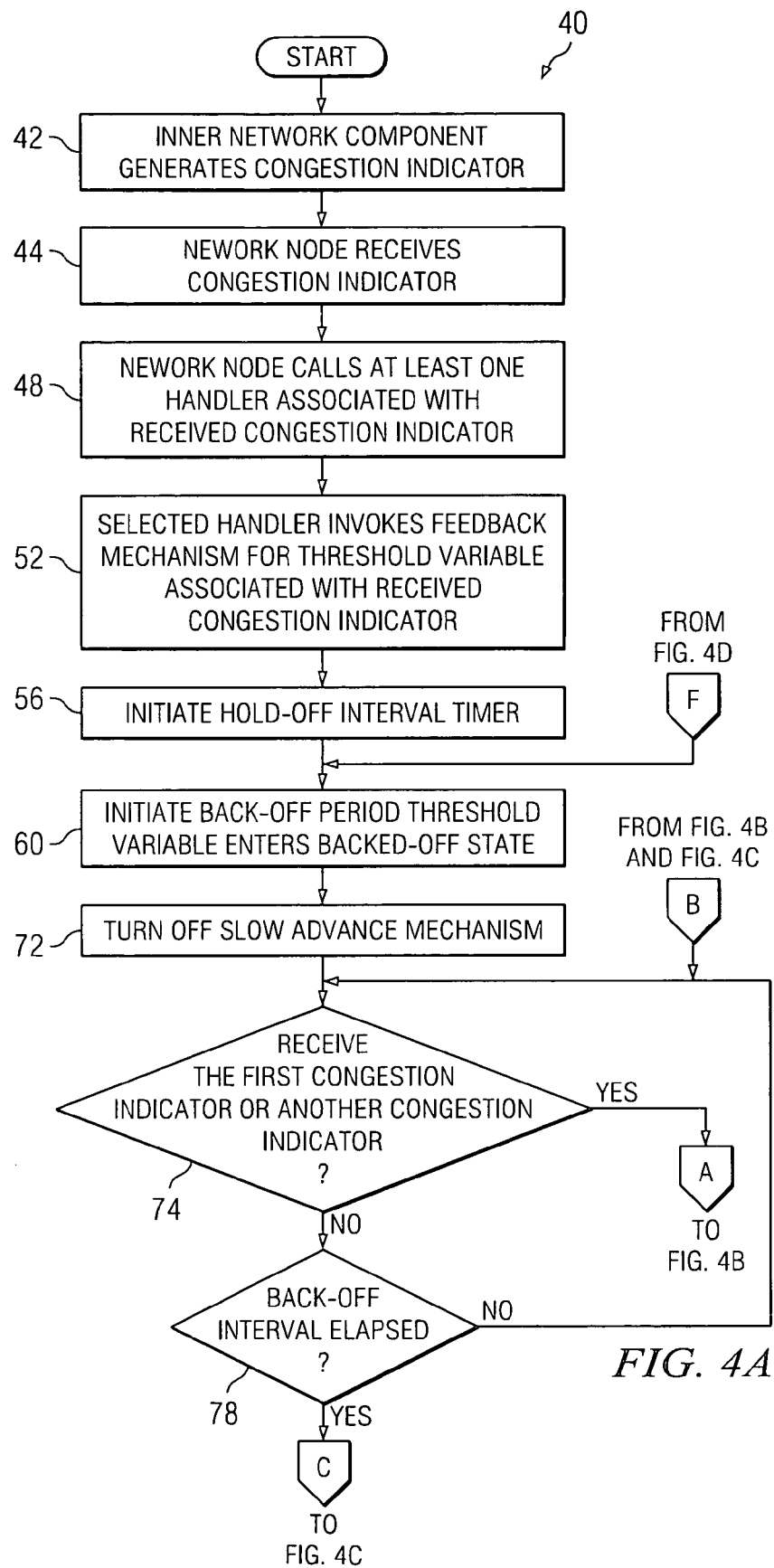
FIGS. 4A through 4C are flowcharts illustrating a feedback process for decreasing traffic on the network.

FIGS. 4A through 4D are flowcharts illustrating how the Feedback Mechanism 20, transport protocol 18 and Slow Advance Mechanism 22 (FIG. 2) regulate the flow of traffic across the network 10 (FIG. 1) by regulating the value of a threshold variable, which indicates a maximum amount of specified type of network resources to be allocated for use by a network resource consuming node. FIG. 4A illustrates a back-off process at 40, which begins with a step 42 in which an inner network component carrying traffic for the transport protocol 18 (FIG. 2) generates a congestion indicator 27 (FIG. 3A) indicating congestion in that part of the network. In the described embodiment, the congestion indicator is a control packet 32 (FIG. 3B) created by such inner network component. As mentioned, a network component can generate multiple congestion indicators for a variety of different types of loads and multiple network components may generate congestion indicators independent of each other. However, for purposes of clarity, the description below is directed to a system that generates a single congestion indicator. In step 44, a receiving one of the network nodes 14 (FIG. 1) receives the congestion indicator that was generated in step 42. It determines if the received congestion indicator is recognizable. If not, such congestion indicator is discarded as an invalid one, and the processing would stop at this step. Such happenstance might be recorded. This can happen if the network component that generates such congestion indicator is a newer version hardware compared to the receiving node. A newer version component might have new implementation of congestion indicators not understood by an older network node.

In case the received congestion indicator is determined to be a valid one, in response to receiving the congestion indicator in step 44, the process proceeds to step 48 in which the receiving node: extracts the congestion indicator type identifier value CI_TYPE (FIG. 3B) and uses it to index the data structure 28 (FIG. 3A) to select an appropriate one of the handlers 30 (FIG. 3A); and invokes the selected handler to process the received congestion indicator. As mentioned above, congestion indicator handlers serve as entry points for the Feedback Mechanism 20 (FIG. 2) for managing threshold variables associated with the received congestion indicators. As explained, different congestion indicators require different congestion indicator handlers.

From step 48, the process proceeds to step 52 in which the selected handler invokes the Feedback Mechanism 20 (FIG. 2). Upon invocation, the Feedback Mechanism begins to regulate a threshold variable associated with the received congestion indicator. The Feedback Mechanism controls the usage of network resources by managing the value of a threshold variable associated with the congestion indicator received in step 44. As mentioned the threshold variable defines a maximum amount of a specified type of network resources a node can have outstanding at a time. The specified type of network resources associated with the threshold variable is specified by the congestion indicator type identifier value CI_TYPE (FIG. 3B). The receiving component includes logic (not shown) operative to regulate use by the component of the specified type of network resources based on the value of the threshold variable.

From step 52, the process proceeds to step 56 in which the Feedback Mechanism initiates a Hold Off Interval Timer. In one embodiment, the hold off interval is the time that must elapse between receipts of two congestion indicators in order to count them as isolated congestion indicators. Depending on the implementation, the Hold Off Interval Timer may be specified in terms of real time or in a self-clocking manner. The hold off interval may be determined based on an attribute of the algorithm, an attribute of a threshold variable, or an attribute of a logical connection. As explained below, the Hold Off Interval Timer is used to determine if an additional congestion indicator is defined to belong to the same batch as a previously received congestion indicator. As explained below, if a previously set Hold Off Interval Timer has not yet expired before entering step 56 (in FIG. 1, or 86 in FIG. 2), the congestion indicator would not be independently processed as an isolated one. The execution flow for processing this particular congestion indicator would stop at step 56. The node might choose to record such a reception.

In step 60, the Feedback Mechanism declares that the threshold variable associated with the received congestion indicator is in a backed off state. The Back-Off Period associated with such threshold variable then begins. The backed off state is a state associated with the threshold variable indicating that there has been a recent reception of at least one valid congestion indicator associated with the threshold variable. When the process declares that the associated threshold variable is in the backed off state, the value of the associated threshold variable is managed by the Feedback Mechanism until the Back-Off Period is terminated. During the Back-Off Period, the value of this threshold variable may increase or decrease depending on whether and when the component receives another recognizable and valid congestion indicator of a type corresponding with the congestion indicator received in step 44.

In step 72, the Slow Advance Mechanism 22 (FIG. 2) is turned off following initiation of the Back-Off Period. As will be further explained, the Slow Advance Mechanism increases the threshold variable when not in the Back-Off Period. From step 72, the process proceeds to 74 at which it is determined whether an additional congestion indicator corresponding to the same threshold variable (for which the Back-Off Period has been initiated) has been received. If so, the process proceeds to "A" to execute sub-process 82 (FIG. 4B) as explained below. Alternatively, if it is determined at 74 that an additional congestion indicator corresponding to the same threshold variable has not been received, the process proceeds to 78 at which it is determined whether the back off interval has elapsed, and if so, the process proceeds to "C" to execute a sub-process 130 (FIG. 4C) as explained below. If the back off interval has not elapsed, the process proceeds from 78 back to 74 to determine again whether an additional congestion indicator corresponding to the threshold variable has been received.

Figure 4B:
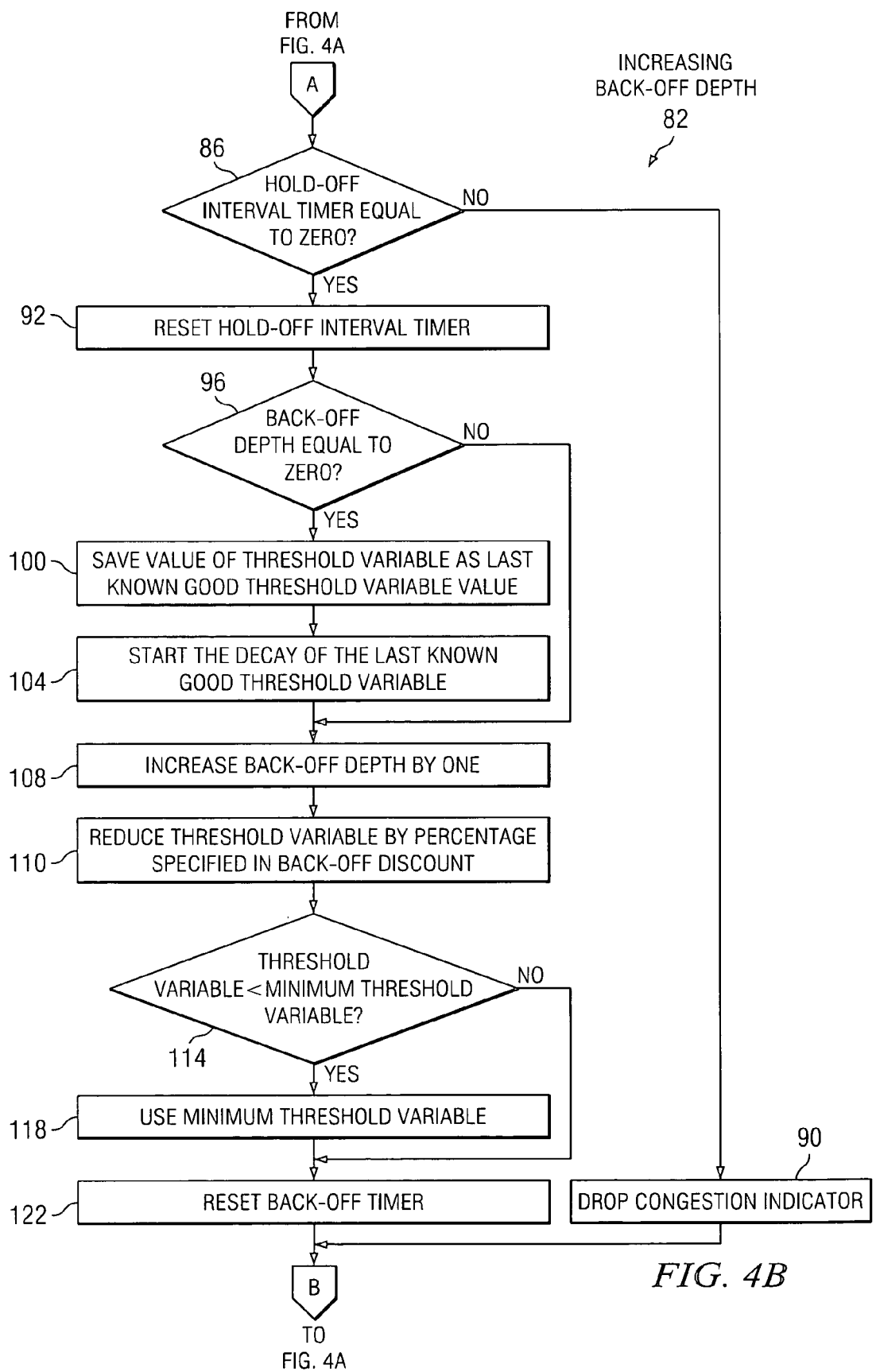

As mentioned, if it is determined at 74 that an additional congestion indicator corresponding to the same threshold variable has been received, the process proceeds to "A" to execute sub-process 82 (FIG. 4B). The sub-process 82 begins with a determination at 86 as to whether or not the Hold Off Interval Timer (initiated upon receipt of the first congestion indicator in step 56 of FIG. 4A) is equal to zero. If the time elapsed between receipt of the first congestion indicator and the additional congestion indicator is not greater than the hold-off interval (the Hold Off Interval Timer is not equal to zero), the sub-process proceeds to step 90 in which the Feedback Mechanism drops the additional congestion indicator, after which the process proceeds back to "B" (FIG. 4A). The hold off interval defines an elapsed time for multiple congestion indicators to be separated in order to count them as isolated congestion indicators. The hold off interval can be a timer in real time, or a self-clocking timer. If the hold-off time interval is non-zero, the additional congestion indicator is defined to belong to the same batch as the previous received congestion indicator (not an isolated one), and the additional congestion indicator will not be processed. In one embodiment, the process records receipt of the congestion indicator, but it won't continue to process it. If it is determined at 86 that the Hold Off Interval Timer is equal to zero, then the additional congestion indicator is assumed to be an isolated one that should be processed as further explained below, and the hold-off interval timer is reset in step 92.

From step 92, the process proceeds to 96 at which it is determined whether the value of the Back-Off Depth variable is equal to zero, which would indicate that the received congestion indicator is the first congestion indicator, of a corresponding type to have been received at the node, that initiated the Back-Off Period in step 60 (FIG. 4A). If it is determined at 96 that the value of the Back-Off Depth variable is equal to zero, the process proceeds to step 100.

In step 100, the Feedback Mechanism records the initial value of the current threshold variable (i.e., the value right before the reception of the first valid congestion) as an initial value of a Last Known Good Threshold Variable. In accordance with the described embodiment, allocation of the specified type of resources should not exceed the value of the current threshold variable until the process declares that the threshold variable may exit the Back-Off Period. The process declares that the threshold variable exits its Back-Off Period when the current threshold variable is greater than the value of the Last Known Good Threshold Variable.

In step 104, the Feedback Mechanism starts a sub-process of decaying the value of the Last Known Good Threshold Variable. As mentioned, the value of the Last Known Good Threshold Variable is initialized when the process declares that a threshold variable enters a new Back-Off Period in step 96. During this sub-process, the value of the Last Known Good Threshold Variable is only decayed slowly over time while the associated threshold value is in Back-Off Period. An attribute, called decay rate, specifies how fast the Last Known Good Threshold Variable decays during the Back-Off Period. In different embodiments, the decay rate may be specified by a rate or a time interval. If the decay rate specifies a time interval, the value of the Last Known Good Threshold Variable is decremented by a unit amount after a specified amount of time has elapsed. In another embodiment, the decay rate may be specified in terms of amount of traffic that has been sent through the related network components by such network node. The decay rate may change in proportional to the rate of traffic that route through the network components related to the threshold variable. The process of decaying the Last Known Good Threshold Variable/value guarantees that a threshold variable will eventually get out of its Back-Off Period regardless of the amount of congestion indicators that have been processed for it. The process of decaying the last known threshold variable value also enables the threshold variable to start off from a lowered value if it has stayed in a Back-Off Period for a long time. The longer time it stays in a Back-Off Period, the lower this value would become.

If it is determined at 96 that the value of the Back-Off Depth variable is not equal to zero, the process proceeds from 96 straight to step 108 without executing steps 100 and 104.

The Back-Off Depth variable is used to monitor the current status of threshold variable. Specifically, the Back-Off Depth variable starts at a value of zero when the receiving component is not in the Back-Off Period. Each time an isolated valid congestion indicator corresponding with the same threshold variable is received (see determination at 74 in FIG. 4A), the Back-Off Depth is increased by one in step 108. In one embodiment, the decaying of the Last Known Good Threshold Variable value has an implication on the Back-Off Depth. When the decay mechanism has reduced the value of the Last Known Good Threshold variable to a level such that the following relationships don't hold:

| | | |
|---|---|---|
| Let | lastG = | Last Known Good Threshold Variable value |
| Let | current = | current threshold variable value |
| Let | discount = | Back-Off Discount |
| Let | depth = | Back-Off Depth |

$$\text{lastG} * \text{discount}^{depth+1} <= \text{current} <= \text{lastG} * \text{discount}^{depth},$$

Figure 4C:
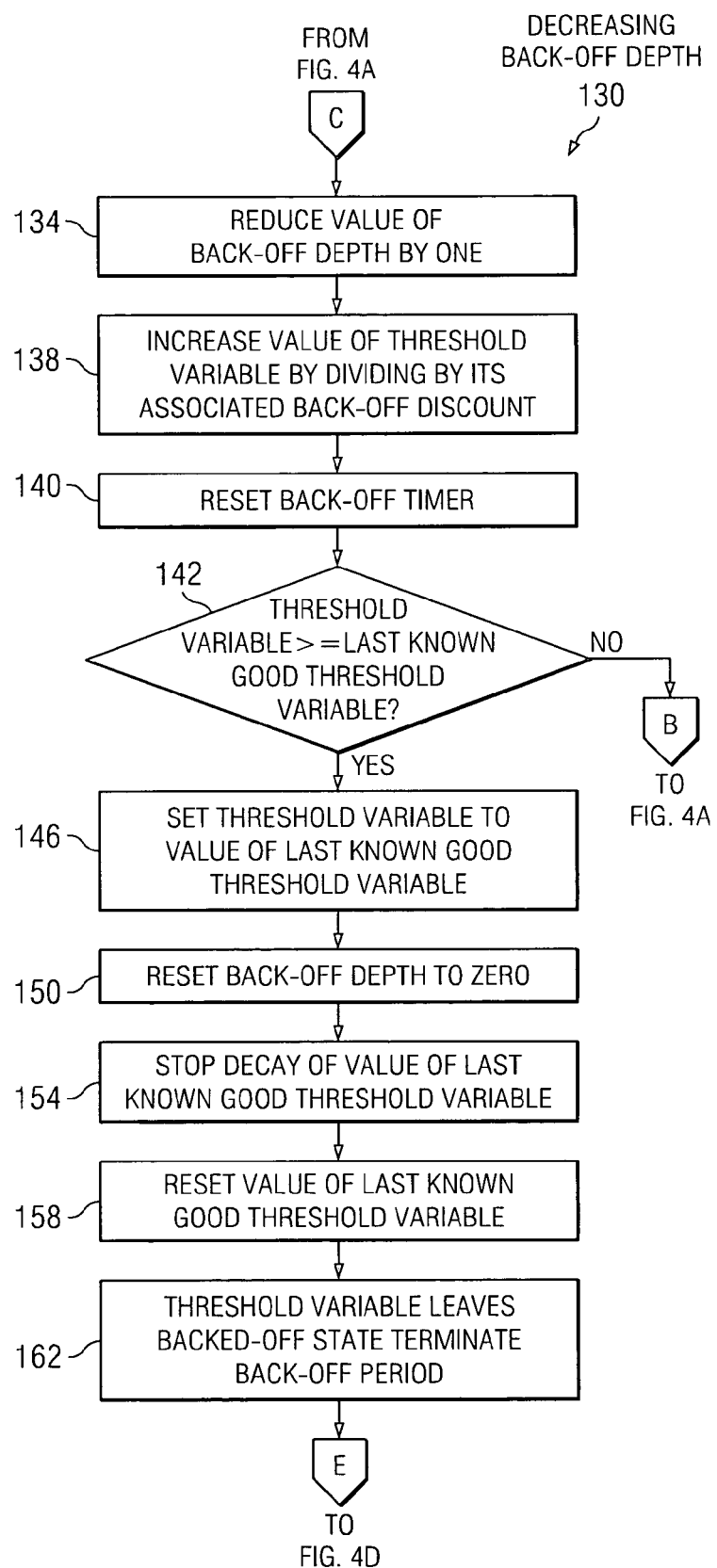

The Back-Off Depth should be reduced until such relationships hold again. In another embodiment, as the Back-Off Depth is used for accounting purpose only, this recalculation of Back-Off Depth is not needed. As explained later, the exit condition of a Back-Off Period involves only the comparison of the value of the current threshold variable and the value of the Last Known Good Threshold Variable shown in step 142 (FIG. 4C). Hence, in this embodiment, the Back-Off Depth only records how many times the current threshold variable has been discounted and the Back-Off Period associated with the threshold variable might be terminated even the Back-Off Depth is greater than zero.

From step 108, the process proceeds to step 110 in which the Feedback Mechanism reduces the value of the threshold variable by a percentage specified in a Back-Off Discount attribute. The Back-Off Discount attribute specifies how much in percentage the recipient of the congestion indicator should reduce the corresponding threshold variable. For example, if the Back-Off Discount is 10%, the recipient of the congestion indicator first decides if it should declare it to be effective, and if so, whether it should honor such advised reduction. If so, the receiving component reduces the corresponding threshold variable by 10%. In varying embodiments, the Back-Off Discount may be an attribute for a threshold variable, an attribute of an application of the process, an attribute of an individual congestion indicator instance. However, the choice has implications on how the threshold variable value is restored when the process is reducing the Back-Off Depth. Hence, if an application of this process applies varying Back-Off Discount values to a threshold variable, the process should keep track of the used values so that when the threshold variable is restored, its value is restored correctly.

As explained above, in one embodiment, the Back-Off Discount is carried in the field 38 (FIG. 3B) of the received congestion indicator. The component receiving a congestion indicator 27 may use the advised traffic reduction value or override it. Upon the reception of a recognized congestion indicator, the component decides if it should use the advisory reduction percentage provided by the congestion indicator. The component may be configured to overwrite the value by other values. For example, the component may be running an up-rift version of this algorithm and may have a new way of handling the congestion indicator. A subsequent increase in Back-Off Depth would increase the value of the Last Known Good Threshold Variable value. The value of the Last Known Good Threshold Variable can only be changed by its slow decay sub-process.

As previously mentioned, the Back-Off Discount may be changed in real time any time in the process. In one embodiment, the Back-Off Depth might serve more than accounting purpose. For example, it might need to accurately reflect the number of times the Feedback Mechanism needs to increase the value of a reduced threshold variable in order to declare a termination of the threshold variable's Back-Off Period. In such case, if the Back-Off Discount is changed on the fly, the Back-Off Depth should be recalculated so that the values of the Last Known Good Threshold Variable, Back-Off Depth and the current threshold variable are consistent with each other. The Last Known Good Threshold Variable is basically the value of the threshold variable right before entering the Back-Off Period for that threshold variable. To obtain the new Back-Off Depth, the following calculation can be performed:

| | | |
|---|---|---|
| Let | lastG = | Last Known Good Threshold Variable value |
| Let | current = | current threshold variable value |
| Let | nDisount = | new Back-Off Discount |
| Let | oDiscount = | old Back-Off Discount |
| Let | nDepth = | new Back-Off Depth |
| Let | oDepth = | old Back-Off Depth |

(Note: lastG = current/oDiscount$^{oDepth}$ if the value is not previously stored)
lastG * nDiscount$^{nDepth}$ ≤ current
=> nDiscount$^{nDepth}$ ≤ current/lastG
=> nDepth * log$_2$(nDiscount) ≤ log$_2$(current/lastG)
=> nDepth ≥ log$_2$(current/lastG)/log$_2$(nDiscount)
(Note: the comparative sign is reversed as nDiscount <1, hence log$_2$(nDiscount) < 0)
=> nDepth = ceiling[log$_2$(current/lastG)/log$_2$(nDiscount)]

Notice that, as the operation would require rounding off intermediate values to integers, the calculation is an approximation, which is close enough for the purpose. In another embodiment, the Back-Off Depth is only for accounting purpose only. This recalculation is not needed in such case. In yet another embodiment, the Back-Off Discount can never be changed. This recalculation is also not needed in this case.

From step 110, the process proceeds to 114 at which the Feedback Mechanism compares the current value of the threshold variable to a minimum value of the threshold variable. Each node sets a minimal attainable value for each threshold variable. By defining a minimal attainable threshold variable value, the Feedback Mechanism can be prevented from over-correcting in obvious cases that would not cause traffic congestion. In this embodiment, the Feedback Mechanism is configured to maintain the threshold variable above the minimum value even though it continues to receive affecting congestion indicators. In this case, the congestion indicators will be dropped in accordance with the Feedback Mechanism policy, but may be recorded for statistics purpose. In one embodiment, the minimum value is obtained by assuming the most pessimistic case. For example, if it is known that there are at least N units of resources available for M number of consumers to share, the minimum value may be set to be N/M for each consumer. This measure would allow penalties to be applied to consumers with higher consumption rates while allowing consumers at least a fixed known portion of the overall available resources.

If it is determined at 114 that the current value of the threshold variable is less than the minimum value of the threshold variable, the process proceeds: to step 118 in which the Feedback Mechanism uses the minimum threshold value as the current threshold value; then to step 122 in which the Feedback Mechanism resets the Back-Off Timer; and then back to "B" (FIG. 4A) to determine if another additional congestion indicator has been received. Alternatively, if it is determined at 114 that the current value of the threshold variable is greater than the minimum value of the threshold variable, the process proceeds directly to step 122 and "B" (FIG. 4A) without executing step 118.

Referring back to FIG. 4A, if it is determined at 74 and 78 that an additional congestion indicator corresponding to the threshold variable has not been received within the back off interval, the process proceeds to "C" to execute a sub-process 130 (FIG. 4C). FIG. 4C shows a flowchart illustrating an operation according to a sub-process 130, which begins with a step 134 in which the Feedback Mechanism 20 (FIG. 2) decreases the value of the Back-Off Depth variable by one. In step 138, the Feedback Mechanism increases the value of the threshold variable by dividing it by the discount value described above with reference to step 110 (FIG. 4B). From step 138, the process proceeds to 140 at which the Back-Off Timer is reset, and then the process proceeds to 142 at which the Feedback Mechanism compares the value of the threshold variable to the value of the Last Known Good Threshold Variable. If the value of the threshold variable is greater than or equal to the value of the Last Known Good Threshold Variable, the process proceeds to execute the following steps: setting the threshold variable equal to the value of the Last Known Good Threshold Variable in step 146; resetting the Back-Off Depth variable to zero in step 150; stopping the decay of the value of the Last Known Good Threshold Variable (step 154) that was initiated in step 104 (FIG. 4A); resetting the value of the Last Known Good Threshold Variable in step 158; declaring the threshold variable exiting the backed off state and terminating the Back-Off Period (step 162), which was initiated in step 100 (FIG. 4A). Alternatively, if it is determined at 142 that the value of the threshold variable is less than the value of the Last Known Good Threshold Variable, the process proceeds to "B". From step 162, the process proceeds to "E" (FIG. 4D) in which the Slow Advance Mechanism 22 executes a Slow Advance process to increase the value of the threshold variable while the threshold variable is not in a Back-Off state.

Figure 4D:
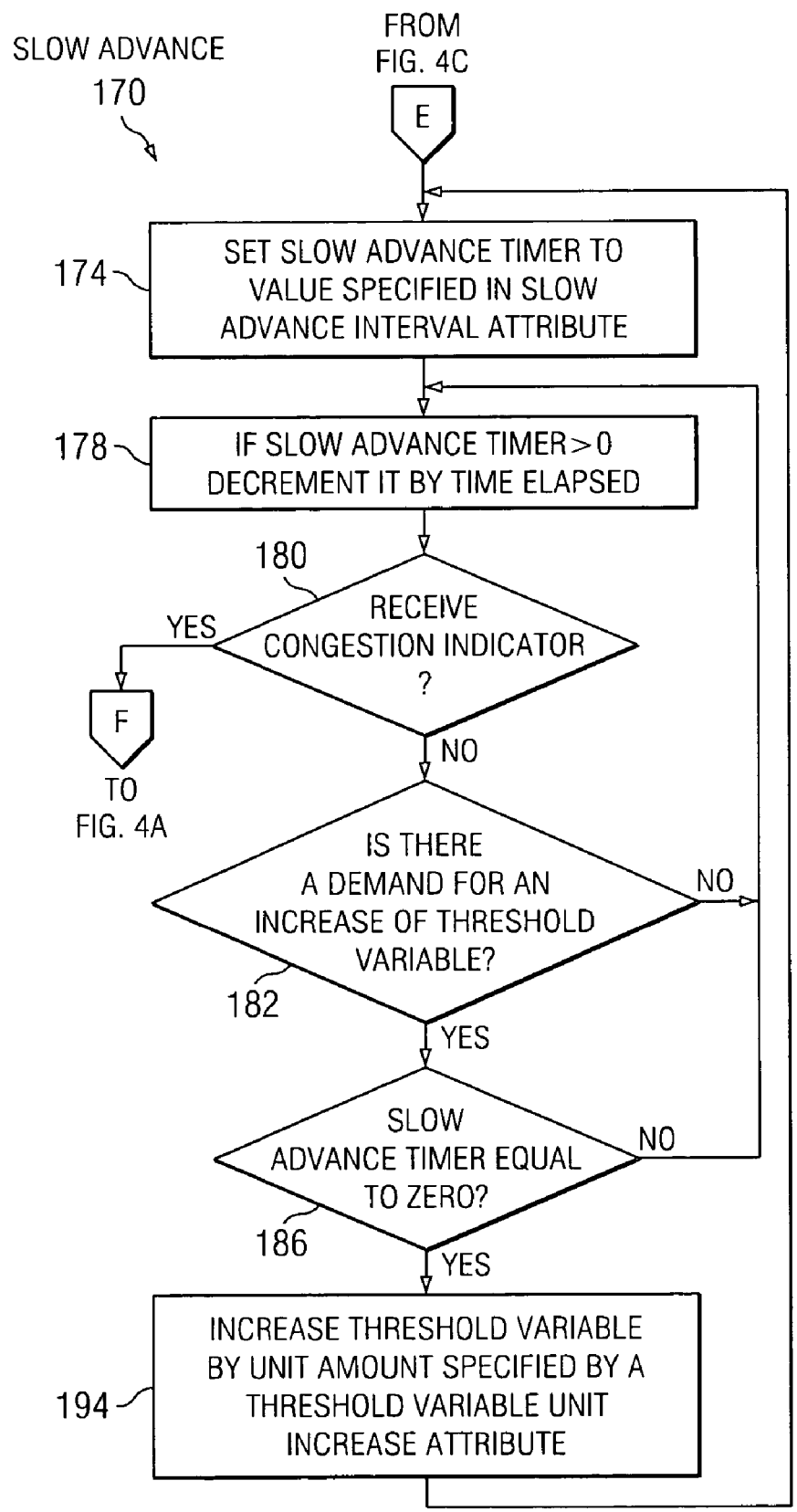
FIG. 4D is a flowchart illustrating a Slow Advance process for increasing traffic on the network.

As previously mentioned, when a threshold variable maintained by a node 14 (FIG. 1) is not in the Back-Off Period, the Slow Advance Mechanism 22 (FIG. 2) is initiated and executing for that threshold variable. Referring to FIG. 4D, a flowchart describing a Slow Advance process performed by the Slow Advance Mechanism is shown. As mentioned, the Slow Advance Mechanism 22 (FIG. 2) counterbalances the back off done to the threshold variables by the Feedback Mechanism 20. The Slow Advance Mechanism 22 allows a component 16 to increase resource usage level (e.g., network traffic) at a safe and controlled pace.

The Slow Advance process begins with a step 174 in which the Slow Advance Mechanism 22 (FIG. 2) sets a Slow Advance Timer to a value specified in a Slow Advance Interval attribute. The Slow Advance Timer is used to time when the Slow Advance Interval has elapsed. In different embodiments, the Slow Advance Interval and the timer can be specified in real time or in a self-clocking manner. In subsequent descriptions, the former case is assumed. In step 178, the Slow Advance Mechanism begins to decrement the Slow Advance Timer in units of real time elapsed if it is greater than zero.

As mentioned, the threshold variable indicates the maximum amount of network resources that can be allocated for the purposes defined by the threshold variable. Most of the time, there is no need for the node to utilize the maximum amount of resources allocated, and the resource usage level is therefore generally maintained below this maximum level. Each node 16 (FIG. 1) is operative to monitor the amount of resources (of the type corresponding with the threshold variable) being used by the node. From step 178, the Slow Advance process proceeds to step 180 to see if a congestion indictor associated with this threshold variable has been recently received since the Slow Advance Mechanism has started. If so, the execution flow goes to "F" of FIG. 4A. The Slow Advance Mechanism will then be terminated.

If there has not been any reception of congestion indicator associated with this threshold variable, the execution flow goes to step 182. Step 182 determines whether there has been an increased demand of increasing the threshold variable value. This step is typically done in an event driven way. More specifically, the transport protocol 18 (FIG. 2) would inform the Slow Advance Mechanism when an increased resource usage is demanded. If so, the transport protocol would mark in certain data structures in such a way that when the Slow Advance Mechanism has reached step 182, it would be able to recover such marking and proceed to step 186. The Slow Advance Mechanism makes the determination at 186 by ascertaining whether or not the amount of resources (of the type corresponding with the threshold variable) being used by component is greater than or equal to the maximum amount of resources allocated as indicated by the current value of the threshold variable. If it is determined at 182 that the maximum amount of threshold usage has been met, then the process proceeds to 186 to determine whether the Slow Advance Timer is equal to zero (which would indicate that the Slow Advance Timer has expired). The Slow Advance process continues to decrement the Slow Advance Timer in step 178 until the determinations at 182 and 186 indicate that the maximum amount of threshold usage has been met and the Slow Advance Interval has been terminated, after which the process proceeds to step 194. If it is determined at 180, 182 and 186 that another congestion indicator has still not been received, the maximum amount of threshold usage has been met, and the Slow Advance Interval has been terminated, the process proceeds to step 194 in which the Slow Advance Mechanism 22 (FIG. 2) increases the value of the threshold by a unit amount specified by a threshold variable unit increase attribute.

Once the threshold variable has been increased in step 194, the Slow Advance process returns to step 174 in which the Slow Advance Timer is reset and the process begins again. The Slow Advance Mechanism 22 (FIG. 2) continues operating until a valid congestion indicator is generated thereby indicating network congestion. As such, the valid congestion indicator will stop the Slow Advance Mechanism 22 and begin the Feedback Mechanism 20.

Figure 5:
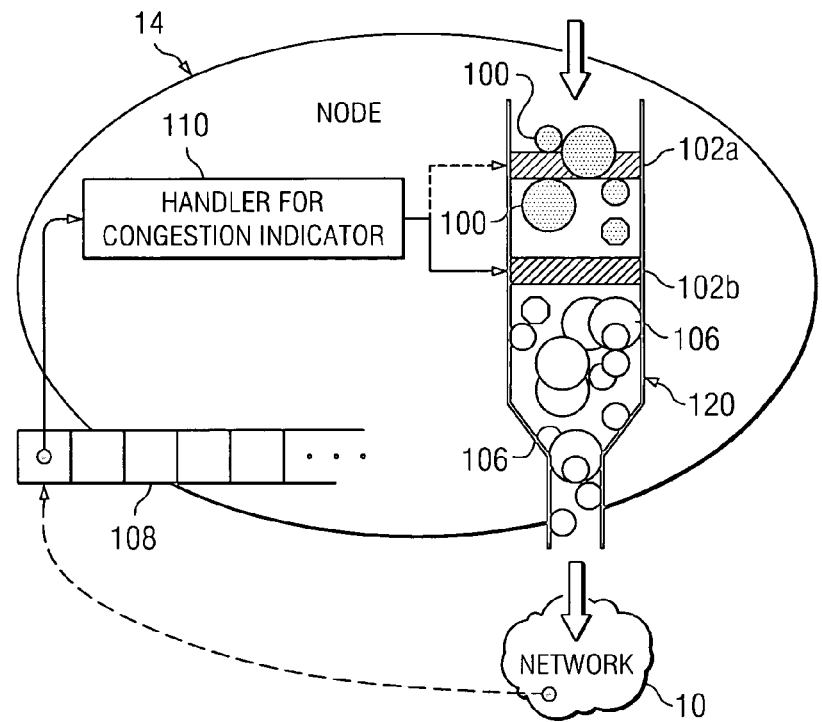
FIGS. 5-9 are diagrams illustrating various network traffic control scenarios.

Referring to FIG. 5, a diagram showing how a threshold variable is adjusted is shown. In this example, outstanding requests 106 are delivered to the network 10 from the node 14. The network 10 generates a congestion indicator A when congestion occurs. As previously mentioned, the congestion indicator A can be generated by any component when congestion occurs. The node 14 has a list of congestion indicator handlers 108, and a congestion handler 110 for processing the congestion indicator A. The handler 110 for the congestion indicator A reduces the original threshold level 102a to a new threshold level 102b for a traffic control device 120 in order to decrease the amount of outstanding requests 106 placed on the network 10. In this regard, the number of queued requests 100 will increase with the new lowered threshold level 102b. The node 14 uses the Feedback Mechanism 20 and Slow Advance Mechanism 22 (FIG. 2) as described above to regulate the number of outstanding requests 106 placed on the network.

Figure 6:
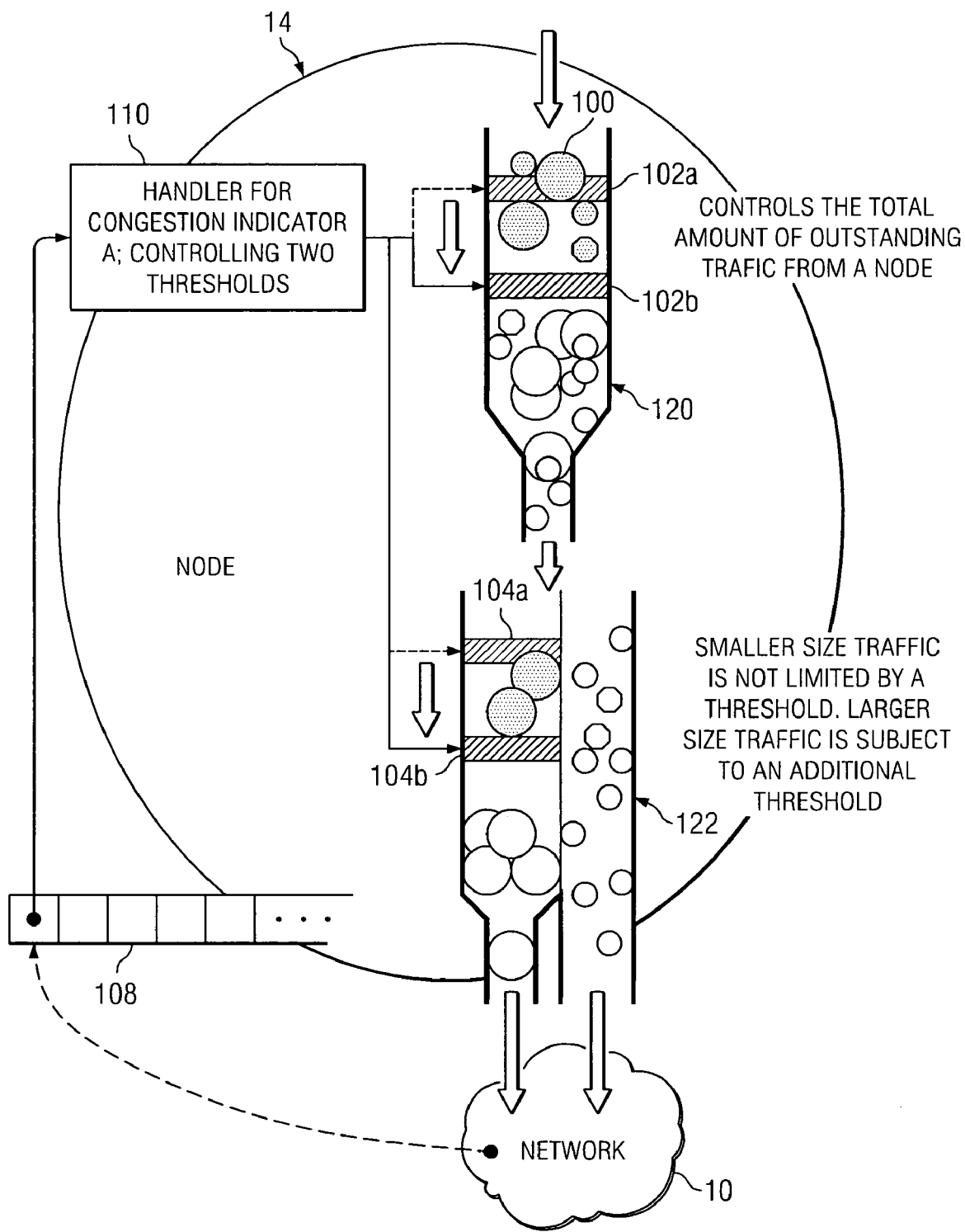

Referring to FIG. 6, a figure illustrating how threshold variables can be cascaded is shown. Specifically, queued requests are controlled by a first traffic control device 120 with an original threshold value 102a. The first traffic control device 120 controls the total amount of outstanding traffic from the node 14. A second traffic control device 122 controls larger sized traffic flowing from the first traffic control device 120, but not smaller sized traffic. The second traffic control device 122 has an original threshold value 104a. A congestion indicator A from the network 10 is processed by the list of congestion indicators 108 and the handler 110. Both the original threshold variables 102a and 104a are controlled upon the receipt of the same congestion indicator A. Specifically, threshold variables 102a and 104a are changed to new threshold variables 102b and 104b. In this regard, the single congestion indicator A can be used to control both cascaded threshold variables.

Figure 7:
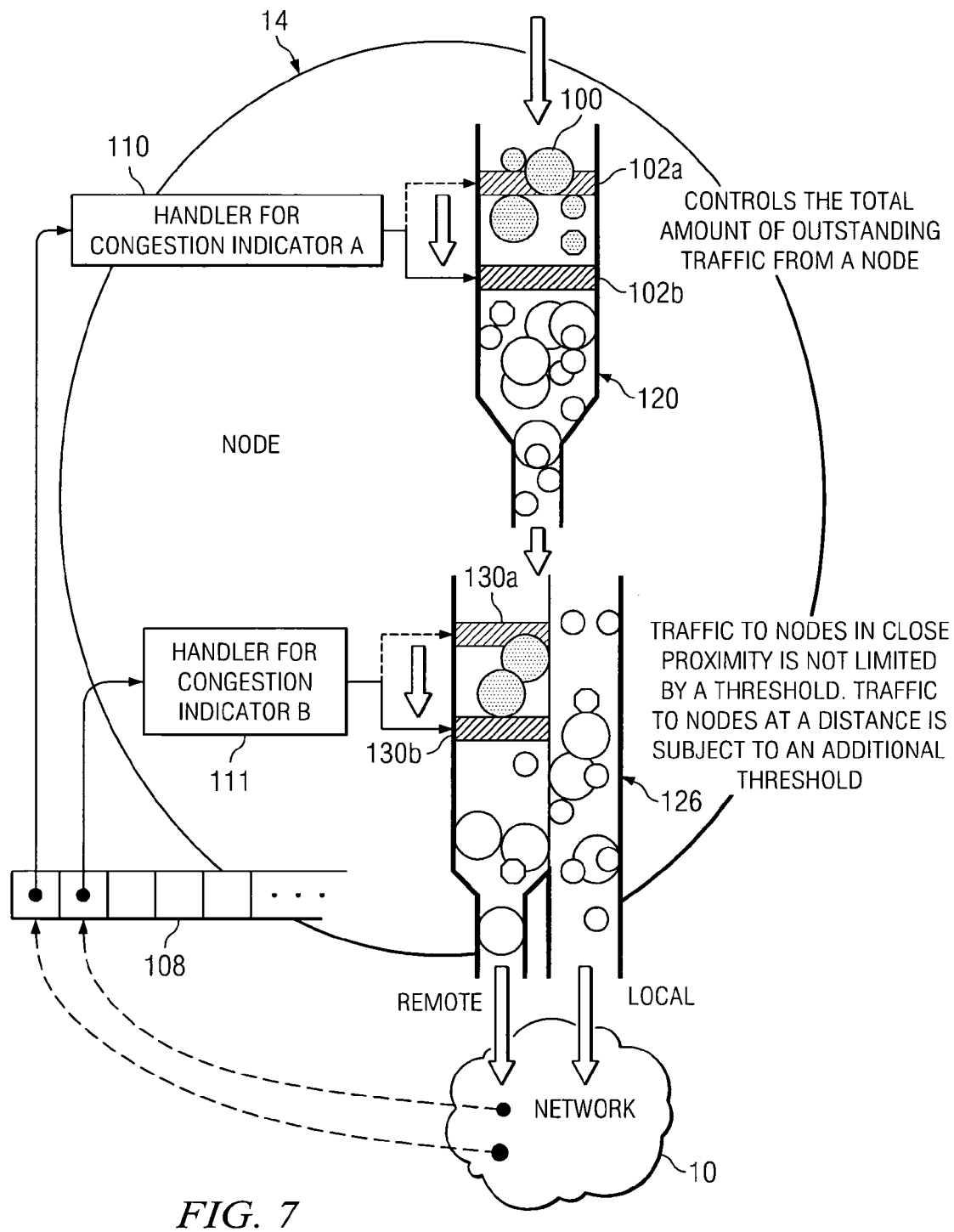

As previously mentioned, it is also possible to use multiple congestion indicators for controlling respective threshold variables. Specifically, referring to FIG. 7, the first traffic control device 120 controls the total amount of outstanding traffic from node 14. A second traffic control device 126 only controls the amount of traffic going to remote nodes of the network 10. Traffic going to nodes in close proximity to node 14 is not further regulated by control device 126. However, traffic to nodes a remote distance from the node 14 is limited by an additional threshold maintained by control device 126. The network 10 generates congestion indicator A and congestion indicator B which are processed by the list of congestion indicators 108 and respective handlers 110 and 111. The congestion handler 110 for congestion indicator A changes the old threshold variable 102a to a new threshold variable 102b in order to control the total amount of outstanding traffic. Similarly, the congestion handler 111 for congestion indicator B changes the value of the old threshold variable 130a to the new threshold variable 130b for traffic going to remote nodes of the network. In this regard, FIG. 7 illustrates how two congestion indicators can be used to control the traffic from a single node of the network 10.

Figure 8:
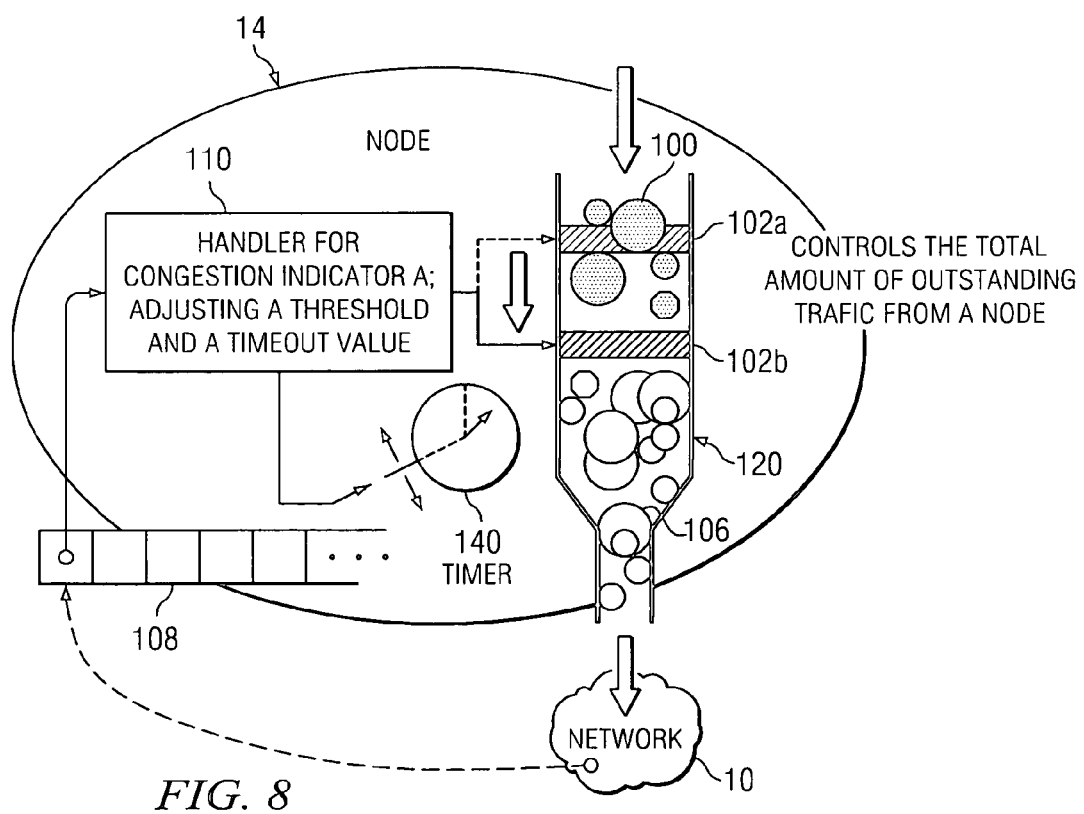

Referring to FIG. 8, a figure illustrating how a timer 140 can be adjusted with the congestion indicator is shown. Specifically, congestion indicator A can control the flow rate of the traffic control device 120 and the timer 140. The timeout value of the timer 140 may be adjusted according to the amount of traffic flowing in the network 10.

Figure 9:
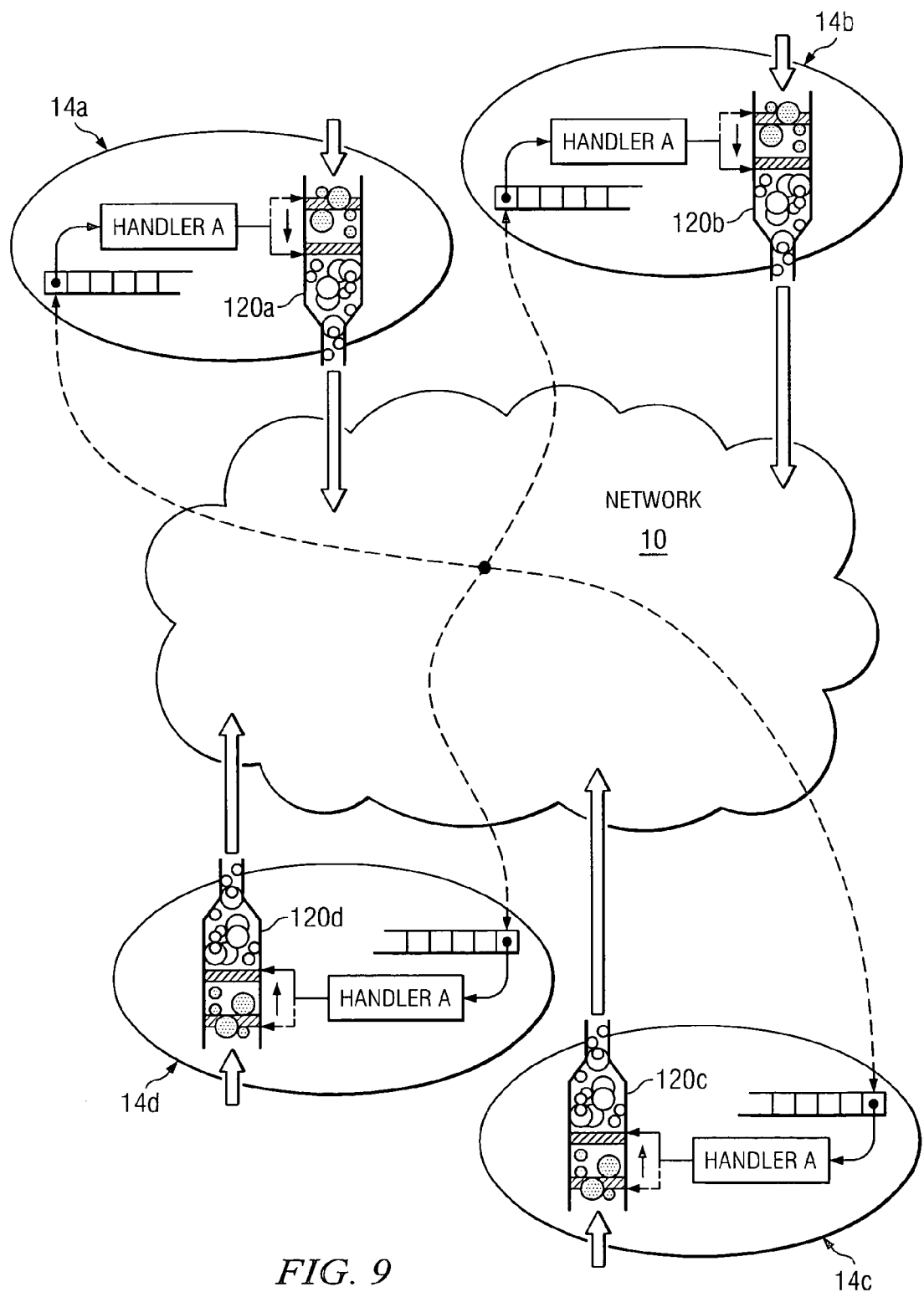

Referring to FIG. 9, it is shown how multiple nodes 14a-14d receive congestion indicator A in order to control network traffic. Specifically, the network 10 generates congestion indicator A to each of the nodes 14a-14d that has a respective traffic control device 120a-120d. Therefore, each traffic control device 120 controls the amount of traffic going out onto the network 10, as explained above. In this regard, it is possible to control the total traffic on the network 10 with congestion indicator A.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method of regulating traffic congestion in a network, the congestion being created as peripheral nodes of the network consume network resources, the method comprising the steps of:

generating at least one congestion indicator at an inner network component responsive to an indication of traffic congestion in such network component;

receiving the congestion indicator at one or more network peripheral nodes, wherein a threshold variable associated with the received congestion indicator is used to define a maximum amount of a specified type of network resources to be allocated for a particular use;

initiating a Back-Off Period at the component in response to receiving the congestion indicator, and performing a back off process by, initiating a back off time interval, if an additional valid congestion indicator associated with the threshold variable has been received within the back off time interval, adjusting the value of the threshold variable to reduce the maximum amount, and resetting the back off time interval, and if no additional valid congestion indicator associated with the threshold variable has been received within the back off time interval, adjusting the value of the threshold variable to increase the maximum amount, and terminating the Back-Off Period, wherein the step of terminating the Back-Off Period further includes comparing a current value of the threshold variable to an initial value of the threshold variable, and if the current value is greater than the initial of the threshold variable, terminating the Back-Off Period;

whenever the Back-Off Period is not active, performing a Slow Advance process that includes adjusting the value of the threshold variable to increase the maximum amount; and controlling consumption of the specified type of network resources based at least in part on the value of the threshold variable.

2. A method of regulating traffic as recited in claim 1 wherein the back off process further includes:

recording an initial value of the threshold variable as a value of a Last Known Good Threshold Variable; and limiting the allocation of the specified type of network resources to a level defined by a current threshold variable value below the Last Known Good Threshold Variable during the Back-Off Period.

3. A method of regulating traffic as recited in claim 2 wherein the step of terminating the Back-Off Period includes:

comparing the current value of the threshold variable to the current value of the Last Known Good Threshold Variable; and terminating the Back-Off Period if the current value of the threshold variable is greater than or equal to the current value of the Last Known Good Threshold Variable.

4. A method of regulating traffic as recited in claim 3 wherein the back off process further includes a step of decaying the value of the Last Known Good Threshold Variable during the back off time period.

5. A method of regulating traffic as recited in claim 3 wherein the back off process further includes:

if an additional valid congestion indicator associated with the threshold variable has been received within the back off time interval, determining if the additional valid congestion indicator is a valid congestion indicator received since the initiation of the back off time interval, and if the additional congestion indicator is a valid congestion indicator received since the initiation of the back off time interval, further adjusting the value of the threshold variable to reduce the maximum amount.

6. A method of regulating traffic as recited in claim 3 wherein the back off process further includes:

comparing a current value of the threshold variable to a minimum threshold value following the step of adjusting the value of the threshold variable to reduce the maximum amount; and if the current value of the threshold variable is less than the minimum threshold value, setting the value of the threshold variable equal to the value of the minimum threshold variable.

7. A method of regulating traffic congestion in a network, the congestion being created as peripheral nodes of the network consume network resources, the method comprising the steps of:
- generating at least one congestion indicator at an inner network component responsive to an indication of traffic congestion in such network component;
- receiving the congestion indicator at one or more network peripheral nodes, wherein a threshold variable associated with the received congestion indicator is used to define a maximum amount of a specified type of network resources to be allocated for a particular use;
- initiating a Back-Off Period at the component in response to receiving the congestion indicator, and performing a back off process by,
  - initiating a back off time interval,
  - if an additional valid congestion indicator associated with the threshold variable has been received within the back off time interval, adjusting the value of the threshold variable to reduce the maximum amount, and resetting the back off time interval, and
  - if no additional valid congestion indicator associated with the threshold variable has been received within the back off time interval, adjusting the value of the threshold variable to increase the maximum amount, and terminating the Back-Off Period;
- whenever the Back-Off Period is not active, performing a Slow Advance process that includes adjusting the value of the threshold variable to increase the maximum amount; and controlling consumption of the specified type of network resources based at least in part on the value of the threshold variable;
- wherein the step of adjusting the value of the threshold variable to reduce the maximum amount includes adjusting the value of the threshold variable by a specified percentage of the current value of the threshold variable.

8. A method of regulating traffic as recited in claim 7 wherein the specified percentage is an attribute of the received congestion indicator.

9. A method of regulating traffic as recited in claim 1 wherein the Slow Advance process further includes:
- initiating a Slow Advance time interval;
- determining a currently demanded amount of the specified type of network resources that is currently being used;
- comparing the currently demanded amount to the maximum amount of the specified type of resources allocated as indicated by a current value of the threshold variable; and
- if the currently demanded amount is greater than or equal to the maximum amount of resources allocated, and the Slow Advance interval has expired, adjusting the value of the threshold variable to increase the maximum amount.

10. A method of regulating traffic as recited in claim 9 wherein the step of adjusting the value of the threshold variable to increase the maximum amount includes adjusting the value of the threshold variable by a specified unit value.

11. A method of regulating traffic congestion in a network, the congestion being created as peripheral nodes of the network consume network resources, the method comprising the steps of:
- generating at least one congestion indicator at an inner network component responsive to an indication of traffic congestion in such network component;
- receiving the congestion indicator at one or more network peripheral nodes, wherein a threshold variable associated with the received congestion indicator is used to define a maximum amount of a specified type of network resources to be allocated for a particular use;
- initiating a Back-Off Period at the component in response to receiving the congestion indicator, and performing a back off process by,
  - initiating a back off time interval,
  - if an additional valid congestion indicator associated with the threshold variable has been received within the back off time interval, adjusting the value of the threshold variable to reduce the maximum amount, and resetting the back off time interval, and
  - if no additional valid congestion indicator associated with the threshold variable has been received within the back off time interval, adjusting the value of the threshold variable to increase the maximum amount, and terminating the Back-Off Period;
- whenever the Back-Off Period is not active, performing a Slow Advance process that includes adjusting the value of the threshold variable to increase the maximum amount; and
- controlling consumption of the specified type of network resources based at least in part on the value of the threshold variable;
- wherein the threshold variable is used to define a maximum amount of traffic credit issued to other components in the network.

12. A method of regulating traffic as recited in claim 9 further comprising:
- further adjusting the value of the threshold variable to further increase the maximum amount during the Slow Advance Interval if the currently demanded amount is greater than the maximum amount of resources allocated while the network component is not in the Back-Off Period.

13. A system for regulating traffic in a network having a plurality of components and peripheral nodes, the traffic being created as the network peripheral nodes exchange data and consume network resources, the system comprising:
- means for generating at least one congestion indicator at a network component responsive to an indication of traffic congestion in the network;
- at least one network peripheral node responsive to the congestion indicator, wherein a threshold variable associated with the received congestion indicator is used to define a maximum amount of a specified type of network resources to be allocated for a use associated with the receiving network peripheral node including,
  - a Feedback Mechanism configured to initiate a Back-Off Period at the receiving network node in response to receiving the congestion indicator, and performing a back off process by,
    - initiating a back off time interval,
    - if an additional valid congestion indicator associated with the threshold variable has been received within the back off time interval, adjusting the value of the threshold variable to reduce the maximum amount, and resetting the back off time interval, and
    - if no additional valid congestion indicator associated with the threshold variable has been received within the back off time interval, adjusting the value of the threshold variable to increase the maximum amount, and terminating the Back-Off Period;
  - wherein the Feedback Mechanism is further configured to compare a current value of the threshold variable to an initial value of the threshold variable, and if the current value is greater than the initial of the threshold variable, terminate the Back-Off Period;

a Slow Advance Mechanism configured to adjust the value of the threshold variable to increase the maximum amount whenever the Back-Off Period is not active; and means for controlling the flow of traffic across the network based at least in part on the value of the threshold variable.

14. A system as recited in claim 13 wherein the means for controlling the flow of traffic includes a transport control mechanism.

15. A system as recited in claim 13 wherein the Feedback Mechanism is further configured to:

record an initial value of the threshold variable as a value of a Last Known Good Threshold Variable during the back off process; and limit the allocation of the specified type of network resources to a level below a level defined by the value of the current threshold variable below the Last Known Good Threshold Variable during the Back-Off Period.

16. A system as recited in claim 15 wherein the Feedback Mechanism is further configured to:

compare the current value of the threshold variable to the current value of the Last Known Good Threshold Variable; and terminate the Back-Off Period if the current value of the threshold variable is greater than or equal to the current value of the Last Known Good Threshold Variable.

17. A system as recited in claim 15 wherein the Feedback Mechanism is further configured to decay the value of the Last Known Good Threshold Variable during the back off time period.

18. A system as recited in claim 15 wherein the Feedback Mechanism is further configured:

if an additional valid congestion indicator associated with the threshold variable has been received within the back off time interval, to determine if the additional valid congestion indicator is a first valid congestion indicator received since the initiation of the back off time interval, and if the congestion indicator is a first valid congestion indicator received since the last Back-Off Period, to set the value of the threshold variable equal to the current value of the Last Known Good Threshold Variable.

19. A system as recited in claim 15 wherein the Feedback Mechanism is further configured to:

compare a current value of the threshold variable to a minimum threshold value following the step of reducing the value of the threshold variable; and if the current value of the threshold variable is less than the minimum threshold value, set the value of the threshold variable equal to the value of the minimum threshold variable.

20. A system as recited in claim 13 wherein the Feedback Mechanism adjusts the value of the threshold variable to reduce the maximum amount by a specified percentage.

21. A system as recited in claim 20 wherein the specified percentage is an attribute of the received congestion indicator.

22. A system as recited in claim 13 wherein the Slow Advance Mechanism is configured to:

initiate a Slow Advance Timer;

determine a currently demanded amount of the specified type of network resources that is currently being used;

compare the currently demanded amount to the maximum amount of the specified type of resources allocated as indicated by a current value of the threshold variable; and if the currently demanded amount is greater than or equal to the maximum amount of resources allocated, and the Slow Advance timer has expired, adjust the value of the threshold variable to increase the maximum amount.

23. A system as recited in claim 22 wherein the Slow Advance Mechanism is configured to adjust the value of the threshold variable to increase the maximum amount by a specified fixed value.

24. A system as recited in claim 13 wherein the threshold variable is used to define a maximum amount of traffic credit issued to other peripheral nodes in the network.

25. A system as recited in claim 22 wherein the Slow Advance Mechanism is configured to further adjust the value of the threshold variable to further increase the maximum amount during the Slow Advance Interval if the currently demanded amount is greater than the maximum amount of resources allocated while the threshold variable associated with the resource and network peripheral node is not in the Back-Off Period.

* * * * *